Nov. 24, 1925.                                                              1,562,530
                        H. J. WARD ET AL
              PROCESS AND MACHINE FOR WORKING METAL BARS
                    Filed Feb. 8, 1924              3 Sheets-Sheet 1
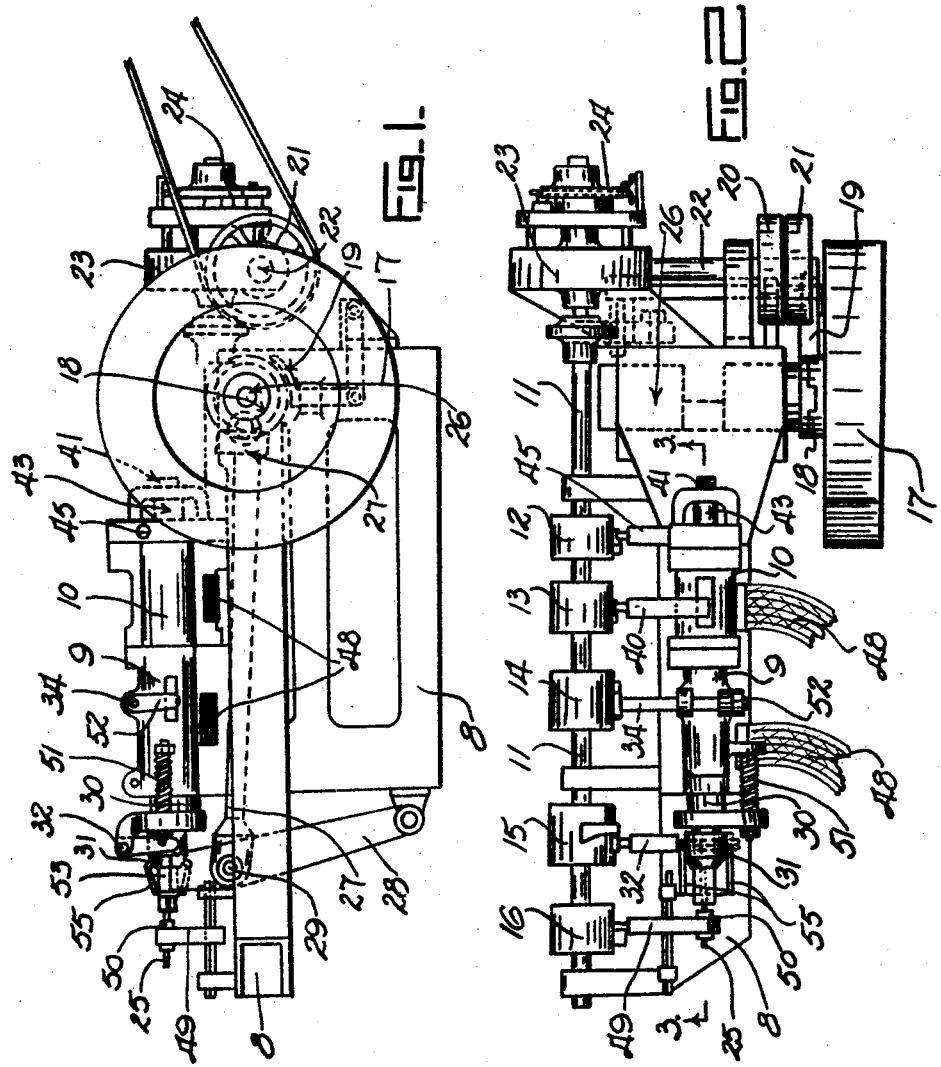
Inventors.
Harry James Ward
and
Walter Roy Ward
By B. Singer. Atty Nov. 24, 1925. 1,562,530
H. J. WARD ET AL
PROCESS AND MACHINE FOR WORKING METAL BARS
Filed Feb. 8, 1924 3 Sheets-Sheet 2

Inventors
Henry James Ward
and
Walter Roy Ward
By B. Singer Atty.

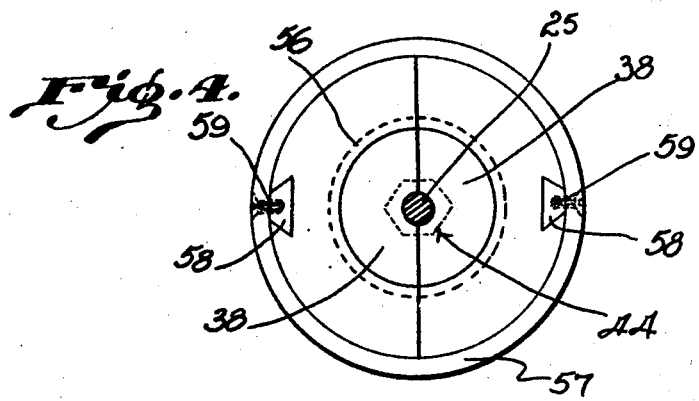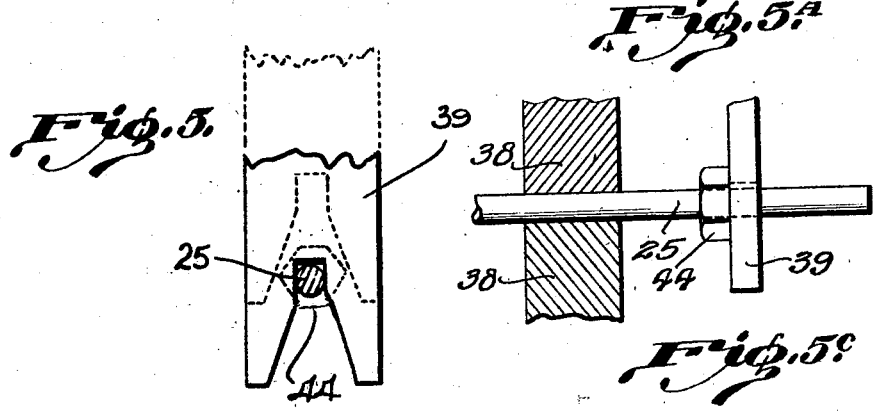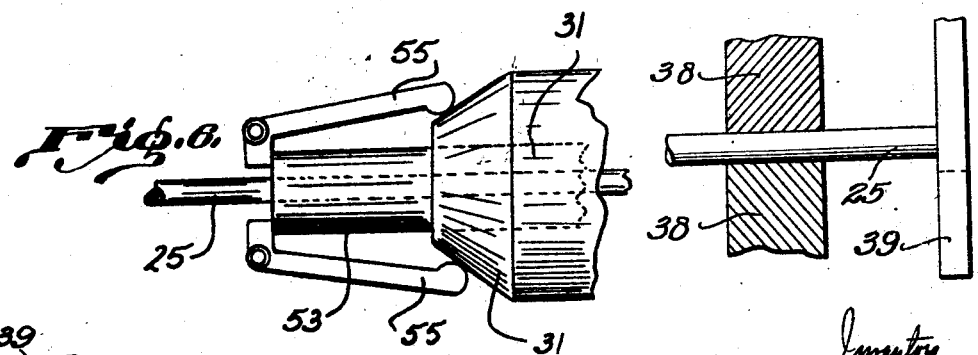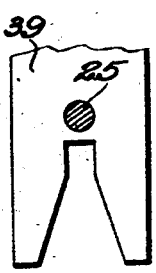

Patented Nov. 24, 1925.

1,562,530

UNITED STATES PATENT OFFICE.

HENRY JAMES WARD AND WALTER ROY WARD, OF BALMAIN, SYDNEY, AUSTRALIA.

PROCESS AND MACHINE FOR WORKING METAL BARS.

Application filed February 8, 1924. Serial No. 691,520.

*To all whom it may concern:*

Be it known that we, HENRY JAMES WARD and WALTER ROY WARD, subjects of the King of Great Britain, residing at Balmain, Sydney, in the State of New South Wales, Commonwealth of Australia, have invented certain new and useful Improvements in Processes and Machines for Working Metal Bars, of which the following is a specification.

This invention relates to a process of manufacturing by heating and forming a plurality of similar or dissimilar formations on a metal bar. The invention is especially applicable to the manufacture of bolts, screws, or any formed article which is at present produced on a turning machine from a solid bar.

Our object has been to provide an economical process whereby exact shapes are formed, free from flaws, or fins, at definite intervals to each other and with the minimum scaling of the bar, the whole operation being carried out continuously and automatically.

In carrying out this improved process for example in the manufacture of a hexagon headed bolt of say ¼ inch. A ¼ inch diameter bar is suitably supported on two heads fixed on the bed of the machine, one or both of which heads is or are insulated from the bed. At the rear of the forward head is a feeding mechanism which feeds the bar through the heads. The forward and rear heads are provided with suitable gripping jaws which are operated to open and close synchronously with the intermittent feed motion by suitable cams. Whilst the bar is held by the means in the heads, an electric current is passed through the heads and that portion of the bar between the heads; when that portion reaches a suitable heat, the power switch is opened and a hexagon punch slidable in the forward head is moved through a hexagonal sleeve, the face of which sleeve is held at that time against the face pieces of the jaws in the rear head, said face pieces having an opening corresponding to the section of the bar. This forward movement of the hexagonal punch forms the heated metal bar to the shape of a hexagonal headed bolt.

By means of cams, the jaws of the rear head are opened and the bar released from the forward head enabling the bar to be moved forward and the operation repeated.

When dissimilar formations on a bar are desired, one or more additional heads may be provided on the machine, such heads corresponding to the dissimilar shape or shapes.

But in order that our invention may be more clearly comprehended, we will now refer to the accompanying drawings in which is illustrated a practical machine for carrying out our process of manufacture.

Figure 1, is a side elevation of such a machine, and

Figure 2, is a plan view thereof, while

Figure 4, is a section on line 4—4, Figure 3, of the face pieces of the jaws and sleeve.

Figure 5, is an enlarged part elevation of the stop to measure the exact length of bar, the dotted lines showing the stop in the raised positions.

Figure 3:
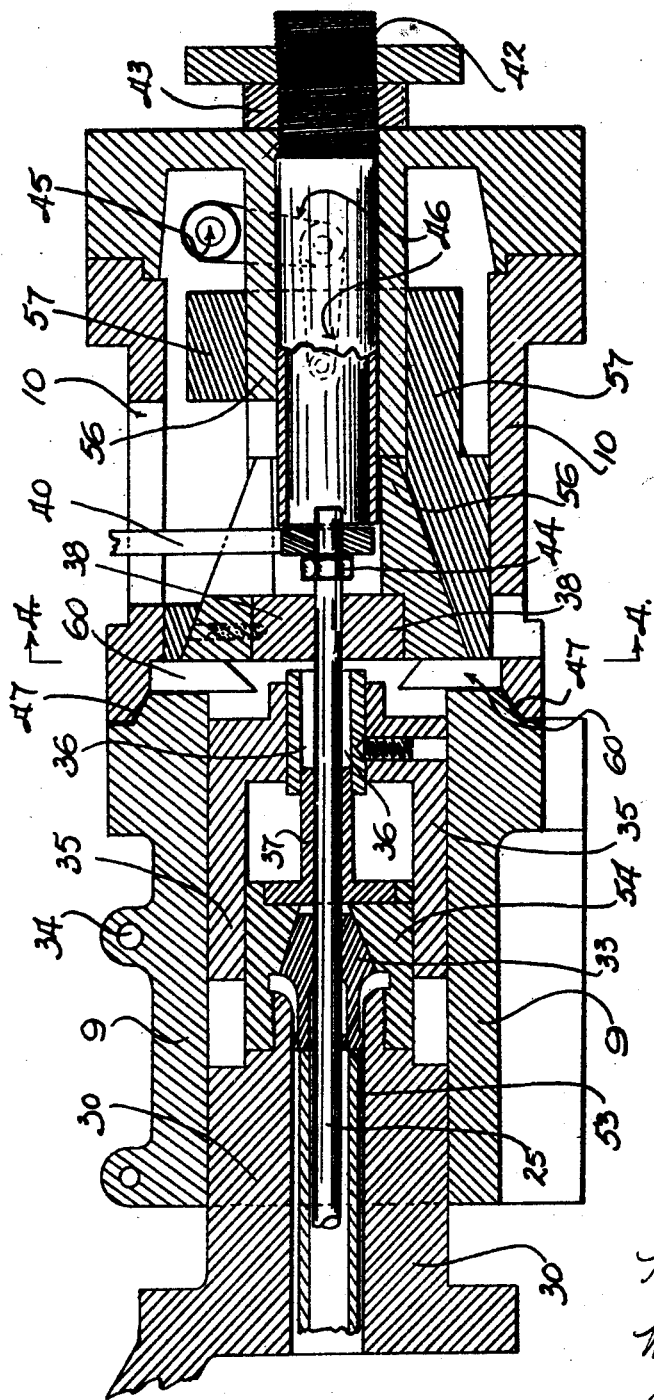
Figure 3, is an enlarged sectional elevation on line 3—3 Figure 2, of the two heads, showing a bar with one formation thereon, and in a position to form a second one.

Figures $5^a$, $5^b$ and $5^c$ are detail sectional views showing the bar or rod and stop in various positions and illustrating steps in the process of forming.

Figure 6, is an enlarged part side elevation of the means employed to close the gripping jaws in the forward head.

The same numerals indicate the same or corresponding parts.

On a suitable frame 8 of the machine is positioned the two heads, 9 being the forward, and 10 the rear head. 11 is a cam shaft on which are arranged cams 12, 13, 14, 15, and 16. 17 is a flywheel with clutch 18 and operating means 19 therefor, while 20 and 21 are fast and loose belt pulleys mounted on a transverse shaft 22, suitable gearing 23 being interposed to drive the cam shaft 11. 24 is an electric make and break control for the current adapted to heat the bar or rod 25. 26 is the crank shaft driven by the flywheel 17, and 27 is a crank arm or rod connected to the lever or arm 28 at 29 for operating the movable slide 30 in the forward head 9. This slide 30 carries on its rear extension a sliding cone 31, operated by cam lever 32, which cone opens and closes the spring chuck or gripping jaws 33 through the levers 55 which forces the tubular member 53 inwardly to seat the chuck 33 in its tapered seat in the sleeve 54. The cam lever 34 operates movable sleeve 35 through the crank lever 52, which sleeve carries forming sleeve 36 of desired conformation, which in conjunction with slidable punch 37 forms the actual die. A resilient post 51 is provided on the forward head to return the slide 30 to its normal position.

In the rear head 10 is positioned faced jaws 38 which are mounted in split sleeve or members 56. Dovetail guides 58 connect these members 56 to the sleeve 57 to which they are secured by screws or the like 59. This sleeve 57 is moved by the cam lever 45 through links or levers 46. Guide or locating piece 60 is provided to centre the faced jaws 38 and members 56.

39 is a stop raised and lowered by cam arm 40, and 41 is a tubular stop, threaded at 42 and provided with a nut 43 so that the required distance between the formations 44 on the bar 25 may be measured and adjusted. The heads 9 and 10 are insulated from one another at 47 and one or both heads is or are insulated from the frame 8. 48 represent leads from the source of electricity supply. Slide arm 49 carrying self releasing grip 50, operated by the cam 16, feeds the bar 25 through the heads.

The process of forming is carried out as follows;—The bar or rod 25 being advanced into the machine, the cam 16 operating the slide arm 49 carrying self releasing grip 50 feeds the end of the bar 25 up the stop 39 as illustrated in Figures 5$^b$ and 5$^c$. The cams 15 and 12 operating through levers 32 and 45 close the spring chuck or gripping jaws 33 in the head 9, and faced jaws 38 in the rear head 10. The electric make and break 24 is now closed and the portion of the bar between the heads, or the portion to be formed, heated to the required degree. The electric make and break 24 is then opened and the clutch operating means 19 brought into action which closes the clutch 18 allowing the crank shaft 26 to be revolved one revolution by the flywheel 17 and so moves the slide 30 by crank arm 27 and lever 28. This slide 30 then forces the punch 37 along the sleeve 36 carried in movable sleeve 35, which sleeve now moves forward, being operated by cam 14, lever 34 and crank 52, so that the face of sleeve 36 is held against the faced jaws 38, which action causes the heated portion of the bar 25 to be pressed up and formed into the desired shape or formation such as shown at 44. The cams 15 and 12 operating through levers 32 and 45 now open the chuck 33 and faced jaws 38 releasing the bar 25. The stop 39 is then raised by the cam 13 operating lever or arm 40, the bar or rod 25 being advanced by slide lever 49 and feed grip 50. The stop 39 is again lowered so that the formation 44 comes against said stop as illustrated in Figures 5 and 5$^a$.

The chuck 33 and jaws 38 are again closed and the operation repeated.

We would have it understood that we do not restrict ourselves to any particular form or size of dies.

We also may have more than two heads provided with different shaped dies so that the rod may be formed or shaped accordingly in addition to the formations made by the first two heads.

We claim:—

1. A process of manufacturing successively a plurality of formations on a metal bar, consisting of holding the portion of said bar to be operated upon between a pair of insulated heads, passing an electric current through said portion to raise same to the required temperature, forming the desired formation thereon by pressure, and automatically feeding said bar forward into position for the next successive formation, the immediate prior formation acting as a temporary holding means for that end of the bar, the end of the bar forming holding means for the first formation.

2. In a machine for manufacturing successively a plurality of formations on a metal bar, insulated means for gripping said bar at two points, electrical connections for passing a current through said gripped portion of the bar, a sliding punch movable in one of said gripping means, means for automatically and intermittently feeding said bar through the gripping means, and means for synchronously opening and closing said gripping means with the intermittent feed substantially as described.

3. In a machine for manufacturing successively a plurality of formations on a metal bar, a pair of heads mounted on a machine bed, one or both of which is or are insulated, means for intermittently feeding said bar through said heads, jaws on said heads adapted to open and close synchronously with the intermittent feed, electrical means for heating the portion of the bar between said heads, means for operating the electrical current switch, and a slidable punch mounted in a similarly shaped sleeve in one of said heads substantially as herein described.

4. In a machine for manufacturing successively a plurality of formations on a metal bar, a pair of heads mounted on a machine bed, one or both of which is or are insulated, means for intermittently feeding said bar through said heads, jaws on said heads adapted to open and close synchronously with the intermittent feed, electrical means for operating the electrical switch, and a slidable punch mounted in a similarly shaped sleeve, said sleeve being itself slidably mounted in one of said heads substantially as described and as illustrated.

In testimony whereof we have hereunto set our hands.

HENRY JAMES WARD.
WALTER ROY WARD.